United States Patent
Rizzo et al.

(10) Patent No.: US 8,621,603 B2
(45) Date of Patent: Dec. 31, 2013

(54) METHODS AND STRUCTURE FOR MANAGING VISIBILITY OF DEVICES IN A CLUSTERED STORAGE SYSTEM

(75) Inventors: James A. Rizzo, Austin, TX (US); Basavaraj G. Hallyal, Fremont, CA (US); Gerald E. Smith, Niwot, CO (US); Adam Weiner, Henderson, NV (US); Vinu Velayudhan, Fremont, CA (US)

(73) Assignee: LSI Corporation, Milpitas, CA (US)

( * ) Notice: Subject to any disclaimer, the term of this patent is extended or adjusted under 35 U.S.C. 154(b) by 14 days.

(21) Appl. No.: 13/432,220

(22) Filed: Mar. 28, 2012

(65) Prior Publication Data

US 2013/0067569 A1    Mar. 14, 2013

Related U.S. Application Data

(60) Provisional application No. 61/532,585, filed on Sep. 9, 2011.

(51) Int. Cl.
*G06F 9/00* (2006.01)
*G06F 7/04* (2006.01)
*G06F 12/00* (2006.01)
*G06F 12/14* (2006.01)
*G06F 13/00* (2006.01)
*G06F 17/30* (2006.01)
*G11C 7/00* (2006.01)

(52) U.S. Cl.
USPC ............... 726/21; 713/169; 713/189; 726/4; 726/28; 726/29

(58) Field of Classification Search
None
See application file for complete search history.

(56) References Cited

U.S. PATENT DOCUMENTS

| | | | |
|---|---|---|---|
| 6,487,646 B1 * | 11/2002 | Adams et al. | .......... 711/163 |
| 6,651,154 B1 | 11/2003 | Burton et al. | |
| 6,738,872 B2 | 5/2004 | Van Huben et al. | |
| 6,754,739 B1 | 6/2004 | Kessler et al. | |
| 6,944,785 B2 | 9/2005 | Gadir et al. | |
| 7,058,846 B1 | 6/2006 | Kelkar et al. | |
| 7,213,102 B2 | 5/2007 | Buchanan, Jr. et al. | |
| 7,418,550 B2 | 8/2008 | Hetrick et al. | |
| 7,480,941 B1 | 1/2009 | Balasubramaniam et al. | |
| 7,814,065 B2 | 10/2010 | Chan et al. | |
| 7,971,094 B1 | 6/2011 | Benn et al. | |

(Continued)

OTHER PUBLICATIONS

"Common RAID Disk Data Format Specification" Version 2.0 Revision 19 SNIA Technical Position Mar. 27, 2009.

(Continued)

*Primary Examiner* — Shin-Hon Chen
(74) *Attorney, Agent, or Firm* — Duft Bornsen & Fettig, LLP

(57) ABSTRACT

Methods and system for implementing a clustered storage solution are provided. One embodiment is a storage controller that communicatively couples a host system with a storage device. The storage controller comprises an interface and a control unit. The interface is operable to communicate with the storage device. The control unit is operable to identify ownership information for a storage device, and to determine if the storage controller is authorized to access the storage device based on the ownership information. The storage controller is operable to indicate the existence of the storage device to the host system if the storage controller is authorized, and operable to hide the existence of the storage device from the host system if the storage controller is not authorized.

18 Claims, 4 Drawing Sheets

(56) References Cited

U.S. PATENT DOCUMENTS

| | | |
|---|---|---|
| 8,001,242 B2 | 8/2011 | Mild et al. |
| 8,041,735 B1 | 10/2011 | Lacapra et al. |
| 8,190,816 B2 | 5/2012 | Balasubramanian |
| 8,261,003 B2 | 9/2012 | Young et al. |
| 2002/0103964 A1* | 8/2002 | Igari ............................. 711/112 |
| 2004/0205074 A1 | 10/2004 | Berkery et al. |
| 2005/0097324 A1* | 5/2005 | Mizuno ......................... 713/169 |
| 2005/0125557 A1 | 6/2005 | Vasudevan et al. |
| 2005/0188421 A1* | 8/2005 | Arbajian ............................. 726/4 |
| 2005/0240928 A1 | 10/2005 | Brown et al. |
| 2007/0015589 A1* | 1/2007 | Shimizu et al. ................. 463/43 |
| 2007/0067497 A1 | 3/2007 | Craft et al. |
| 2007/0210162 A1* | 9/2007 | Keen et al. .................... 235/451 |
| 2009/0119364 A1 | 5/2009 | Guillon |
| 2009/0222500 A1* | 9/2009 | Chiu et al. ..................... 707/205 |
| 2010/0185874 A1* | 7/2010 | Robles et al. ................. 713/189 |
| 2010/0191873 A1* | 7/2010 | Diamant .......................... 710/14 |
| 2010/0274977 A1 | 10/2010 | Schnapp et al. |
| 2011/0178983 A1 | 7/2011 | Bernhard et al. |
| 2011/0225371 A1 | 9/2011 | Spry |
| 2012/0159646 A1* | 6/2012 | Hong Chi et al. ............... 726/28 |
| 2012/0216299 A1* | 8/2012 | Frank .............................. 726/29 |

OTHER PUBLICATIONS

Ciciani et al. "Analysis of Replication in Distributed Database Systems" IEEE Transactions on Knowledge and Data Engineering, vol. 2 . No. 2 . Jun. 1990.

* cited by examiner

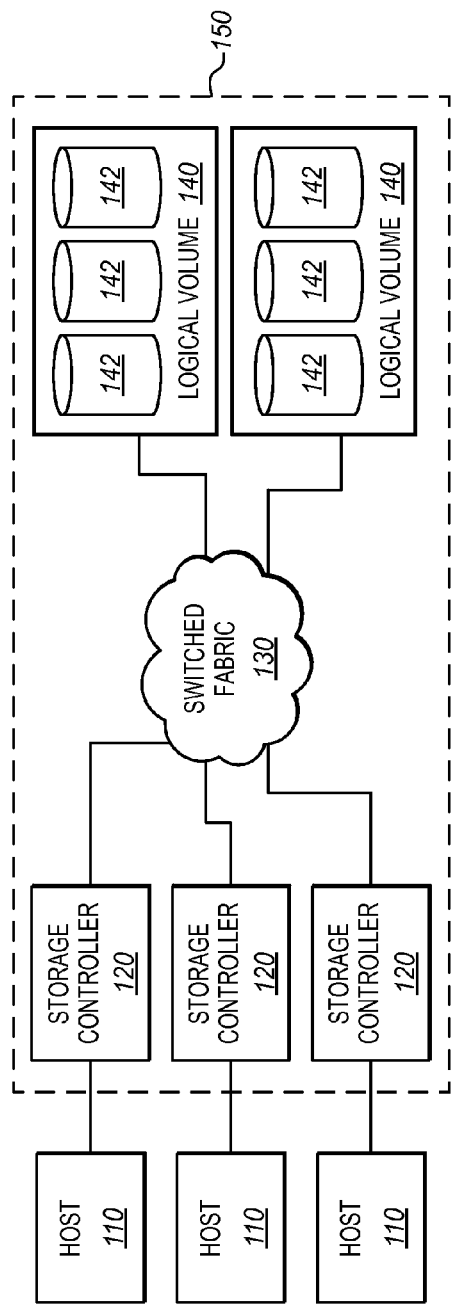
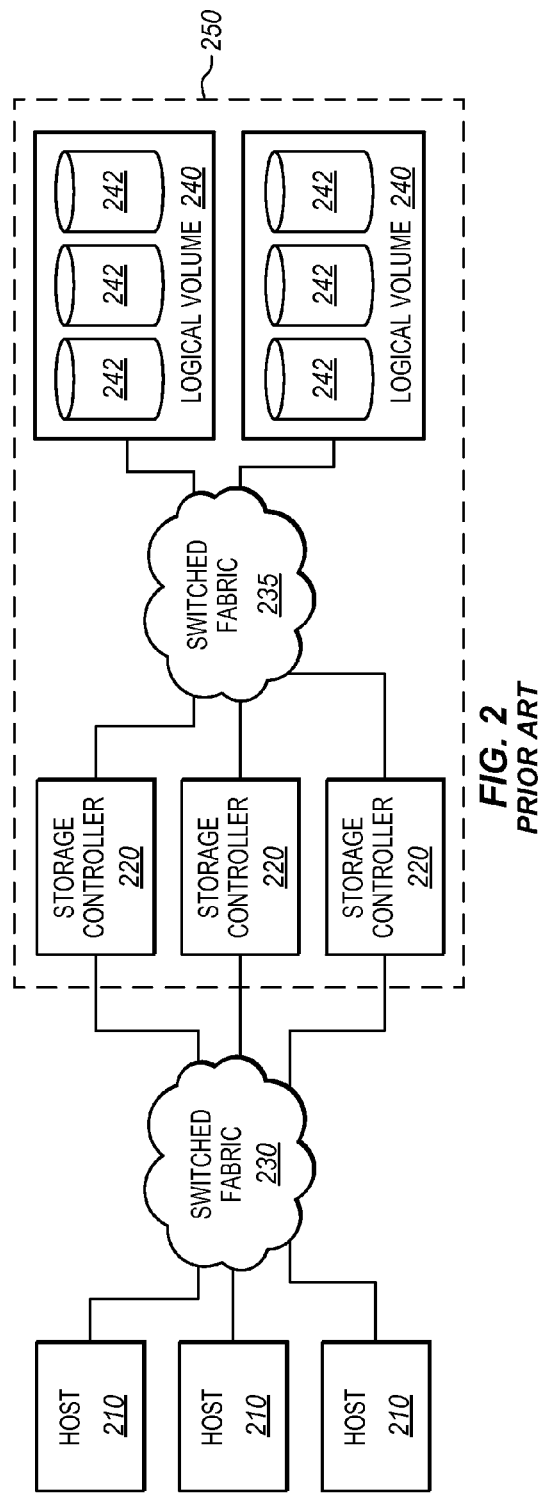

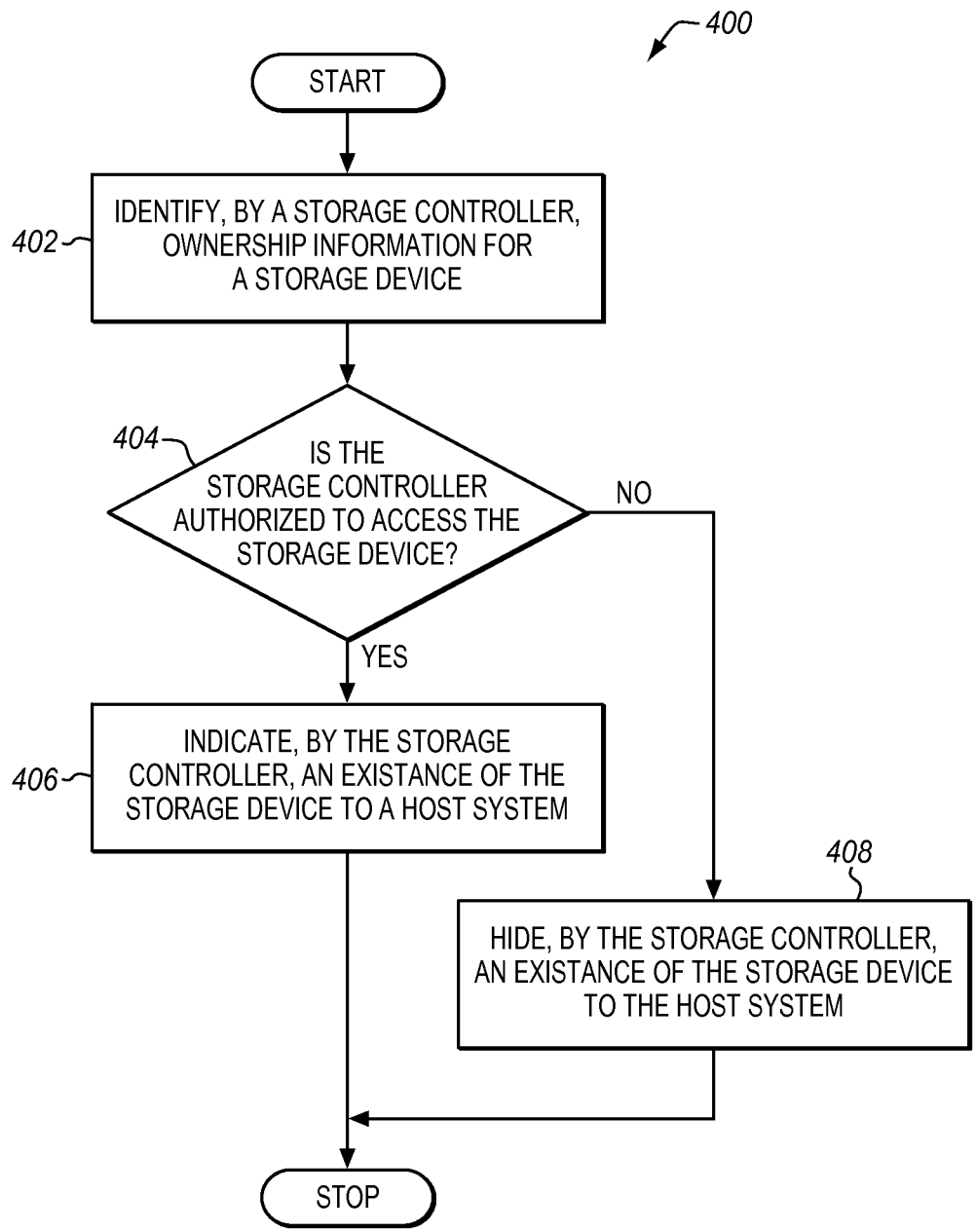

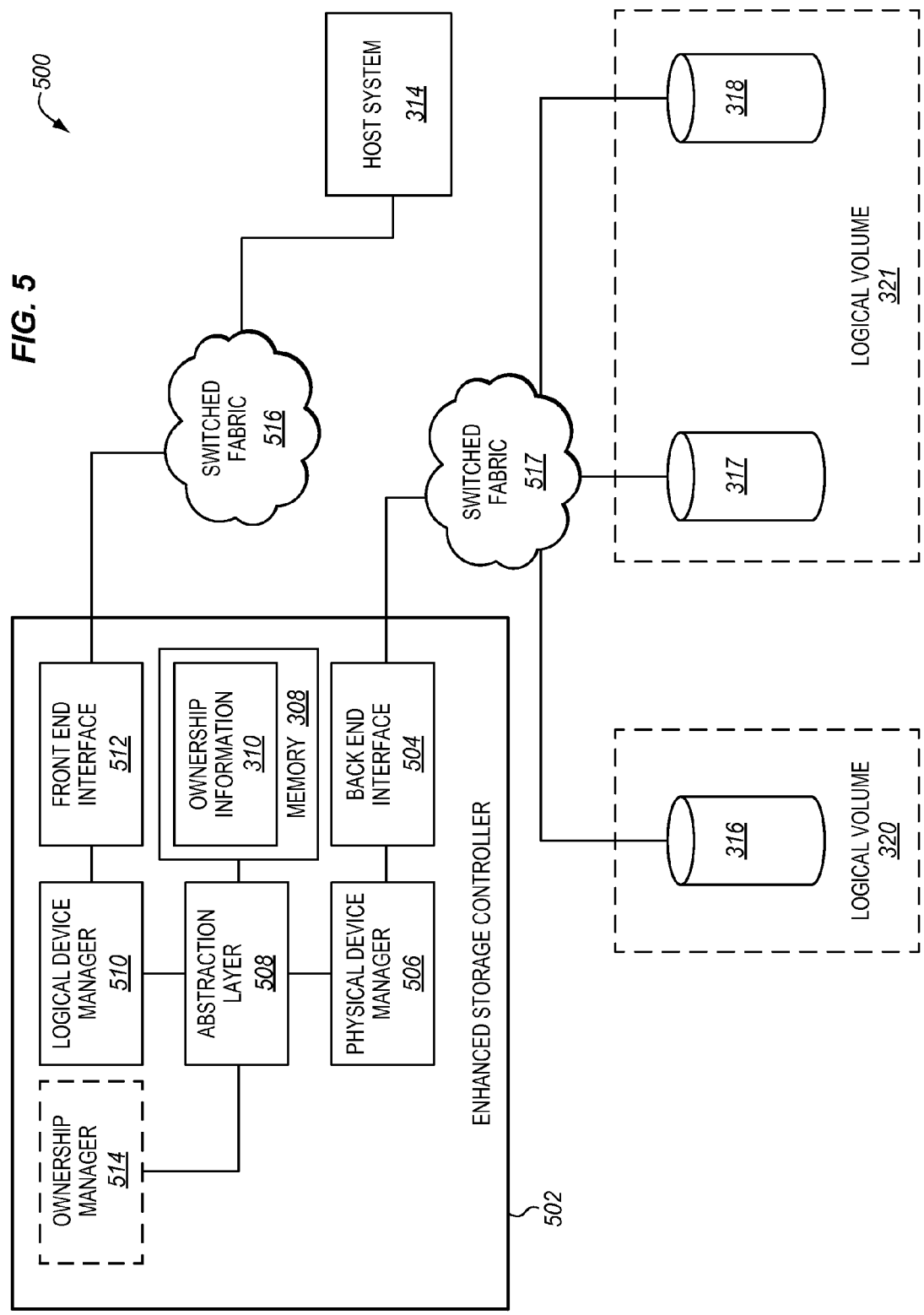

METHODS AND STRUCTURE FOR MANAGING VISIBILITY OF DEVICES IN A CLUSTERED STORAGE SYSTEM

This patent claims priority to U.S. provisional Patent Application 61/532,585, filed on Sep. 9, 2011 and entitled "IO Shipping for RAID Virtual Disks Created On A Disk Group Shared Across Cluster", which is hereby incorporated by reference.

BACKGROUND

1. Field of the Invention

The invention relates generally to management of logical volumes in a storage system, and more specifically relates to techniques for hiding the existence of storage devices and/or logical volumes to portions of a storage controller and/or host systems under certain circumstances.

2. Related Patents

This patent is related to the following commonly owned United States patent applications, all filled on the same date herewith, and all of which are herein incorporated by reference:

U.S. patent application Ser. No. 13/432,131, entitled METHODS AND STRUCTURE FOR TASK MANAGEMENT IN STORAGE CONTROLLERS OF A CLUSTERED STORAGE SYSTEM;

U.S. patent application Ser. No. 13/432,213, entitled METHODS AND STRUCTURE FOR DIRECT PASS THROUGH OF SHIPPED REQUESTS IN FAST PATH CIRCUITS OF A STORAGE CONTROLLER IN A CLUSTERED STORAGE SYSTEM;

U.S. patent application Ser. No. 13/432,223, entitled METHODS AND STRUCTURE FOR LOAD BALANCING OF BACKGROUND TASKS BETWEEN STORAGE CONTROLLERS IN A CLUSTERED STORAGE ENVIRONMENT;

U.S. patent application Ser. No. 13/432,225, entitled METHODS AND STRUCTURE FOR TRANSFERRING OWNERSHIP OF A LOGICAL VOLUME BY TRANSFER OF NATIVE-FORMAT METADATA IN A CLUSTERED STORAGE ENVIRONMENT;

U.S. patent application Ser. No. 13/432,232, entitled METHODS AND STRUCTURE FOR IMPLEMENTING LOGICAL DEVICE CONSISTENCY IN A CLUSTERED STORAGE SYSTEM;

U.S. patent application Ser. No. 13/432,238, entitled METHODS AND STRUCTURE FOR IMPROVED I/O SHIPPING IN A CLUSTERED STORAGE SYSTEM;

U.S. patent application Ser. No. 13/432,150, entitled METHODS AND STRUCTURE FOR IMPROVED BUFFER ALLOCATION IN A STORAGE CONTROLLER; and U.S. patent application Ser. No. 13/432,138, entitled METHODS AND STRUCTURE FOR RESUMING BACKGROUND TASKS IN A CLUSTERED STORAGE ENVIRONMENT.

3. Discussion of Related Art

In the field of data storage, customers demand highly resilient data storage systems that also exhibit fast error recovery times. One type of storage system used to provide both of these characteristics is known as a clustered storage system.

A clustered storage system typically comprises a number of storage controllers, where each storage controller processes host Input/Output (I/O) requests directed to one or more logical volumes. The logical volumes reside on portions of one or more storage devices (e.g., hard disks) coupled with the storage controllers. Often, the logical volumes are configured as Redundant Array of Independent Disks (RAID) volumes in order to ensure an enhanced level of data integrity and/or performance.

A notable feature of clustered storage environments is that the storage controllers are capable of coordinating processing of host requests (e.g., by shipping I/O processing between each other) in order to enhance the performance of the storage environment. This includes intentionally transferring ownership of a logical volume from one storage controller to another. For example, a first storage controller may detect that it is currently undergoing a heavy processing load, and may assign ownership of a given logical volume to a second storage controller that has a smaller processing burden in order to increase the overall speed of the clustered storage system in handling I/O requests. Other storage controllers may then update information identifying which storage controller presently owns each logical volume. Thus, when an I/O request is received at a storage controller that does not own the logical volume identified in the request, the storage controller may "ship" the request to the storage controller that presently owns the identified logical volume.

FIG. 1 is a block diagram illustrating an example of a prior art clustered storage system 150. Clustered storage system 150 is indicated by the dashed box, and includes storage controllers 120, switched fabric 130, and logical volumes 140. Note that a "clustered storage system" (as used herein) does not necessarily include host systems and associated functionality (e.g., hosts, application-layer services, operating systems, clustered computing nodes, etc.). However, storage controllers 120 and hosts 110 may be tightly integrated physically. For example, storage controllers 120 may comprise Host Bus Adapters (HBA's) coupled with a corresponding host 110 through a peripheral bus structure of host 110. According to FIG. 1, hosts 110 provide I/O requests to storage controllers 120 of clustered storage system 150. Storage controllers 120 are coupled via switched fabric 130 (e.g., a Serial Attached SCSI (SAS) fabric or any other suitable communication medium and protocol) for communication with each other and with a number of storage devices 142 on which logical volumes 140 are stored.

FIG. 2 is a block diagram illustrating another example of a prior art clustered storage system 250. In this example, clustered storage system 250 processes I/O requests from hosts 210 received via switched fabric 230. Storage controllers 220 are coupled for communication with storage devices 242 via switched fabric 235, which may be integral with or distinct from switched fabric 230. Storage devices 242 implement logical volumes 240. Many other configurations of hosts, storage controllers, switched fabric, and logical volumes are possible for clustered storage systems as a matter of design choice. Further, in many high reliability storage systems, all the depicted couplings may be duplicated for redundancy. Additionally, the interconnect fabrics may also be duplicated for redundancy.

While clustered storage systems provide a number of performance benefits over more traditional storage systems described above, system administrators still desire the flexibility in controlling the visibility of storage devices and logical volumes in clustered storage to avoid confusion and human error in accessing non-authorized resources. One possibility of controlling the visibility of storage devices and logical volumes in a SAS fabric is through the use of SAS zoning. SAS zoning utilizes zoning expanders to limit the resources that each host "sees" by configuring different policies for each SAS zone within the SAS fabric. In SAS zoning, expander PHYs are assigned to groups to allow access policies to be configured for the different groups. The access policies can ensure that only authorized users can access or "see" certain part of the system. From the perspective of a SAS system administrator, SAS zoning requires no change to the end devices in the network. Initiators continue to perform normal SAS discovery, and initiators and targets send and receive open address frames as usual. However, unlike a typical SAS fabric, initiators and targets do not see the entire SAS domain, also known as a service delivery subsystem. Instead, they only see the portions of the domain, otherwise known as groups, that they have been given permission to see based on a permission table that is configured for and stored at each zoning expander.

While SAS zoning allows for controlling the visibility of storage devices and logical volumes within the SAS fabric, problems may arise when communication failures occur within a zoning topology. For example, if an HBA "owns" a zoning permission table stored at a zoning expander and the HBA becomes unavailable, then it may be difficult to re-assign ownership of the permission table to a new HBA. This leads to failover recovery issues when network problems arise in SAS fabrics that implement SAS zoning. Furthermore, in multipath (i.e., redundant) topologies, wherein an HBA may be coupled with multiple expanders, a similar problem is encountered in that the HBA may be required to re-zone each of the multiple expanders in order to effect a zoning change. If a failure is encountered in a connection between the HBA and one of the expanders, the HBA may be unable to properly implement the zoning change at all of the expanders. Thus, other HBAs in the multipath topology may be exposed to inconsistent zoning information at the different expanders, which is problematic.

Thus it is an ongoing challenge to control the visibility of storage devices and logical volumes in a clustered storage environment.

SUMMARY

The present invention solves the above and other problems, thereby advancing the state of the useful arts, by providing methods and systems for hiding the existence of storage devices and/or logical volumes to portions of a storage controller and/or host systems under certain circumstances. Specifically, according to the methods and systems, ownership information for a storage device is identified within the storage controller. If the storage controller is authorized to access the storage device, then the existence of the storage device is indicated to portions of a storage controller and/or a host system coupled with the storage controller. If the storage controller is not authorized to access the storage device, then the existence of the storage device is hidden from portions of the storage controller and/or the host system.

One aspect hereof provides for a storage controller communicatively coupling a host system with a storage device. The storage controller comprises an interface and a control unit. The interface communicates with the storage device. The control unit identifies ownership information for the storage device. The ownership information defines a storage controller that is authorized to access the storage device. The control unit determines if the storage controller is authorized to access the storage device based on the ownership information. If the storage controller is authorized, then the control unit indicates the existence of the storage device to the host system. If the storage controller is not authorized, then the control unit hides the existence of the storage device to the host system.

Another aspect hereof provides a method operable on a storage controller that communicatively couples a host system with a storage device. According to the method, the storage controller identifies ownership information for the storage device. The ownership information defines a storage controller that is authorized to access the storage device. The storage controller determines if the storage controller is authorized to access the storage device based on the ownership information. If the storage controller is authorized, then the storage controller indicates the existence of the storage device to the host system. If the storage controller is not authorized, then the storage controller hides the existence of the storage device to the host system.

Another aspect hereof provides for a storage controller communicatively coupling a host system with a plurality of storage devices. The storage controller comprises a physical device manager, a logical device manager, and an abstraction layer between the physical device manager and the logical device manager. The physical device manager communicates with the storage devices. In this aspect, the storage devices provision one or more logical volumes. The logical device manager exposes logical volumes that are discovered by the logical device manager to the host system for Input/Output (I/O) operations. The abstraction layer identifies ownership information for the one or more logical volumes, where the ownership information defines a storage controller that is authorized to access a logical volume. The abstraction layer determines if the storage controller is authorized to access the logical volume based upon the ownership information. The abstraction layer indicates the existence of the storage devices that provision the logical volume to the logical device manager in response to determining that the storage controller is authorized to access each of the storage devices that provision the logical volume. Further, the abstraction layer hides the existence of the storage devices that provisions the logical volume from the logical device manager in response to determining that the storage controller is not authorized to access at least one of the storage devices that provision the logical volume.

BRIEF DESCRIPTION OF THE DRAWINGS

FIG. 1 is a block diagram illustrating an example of a prior art clustered storage system.

FIG. 2 is a block diagram illustrating another example of a prior art clustered storage system.

FIG. 4 is a flowchart describing an exemplary method in accordance with features and aspects hereof for hiding the existence of storage devices and/or logical volumes to a host system.

FIG. 5 is a block diagram of another exemplary enhanced storage controller operating within a clustered storage system in accordance with features and aspects hereof to hide the existence of storage devices and/or logical volumes to portions of a storage controller and/or a host system.

DETAILED DESCRIPTION OF THE DRAWINGS

Figure 3:
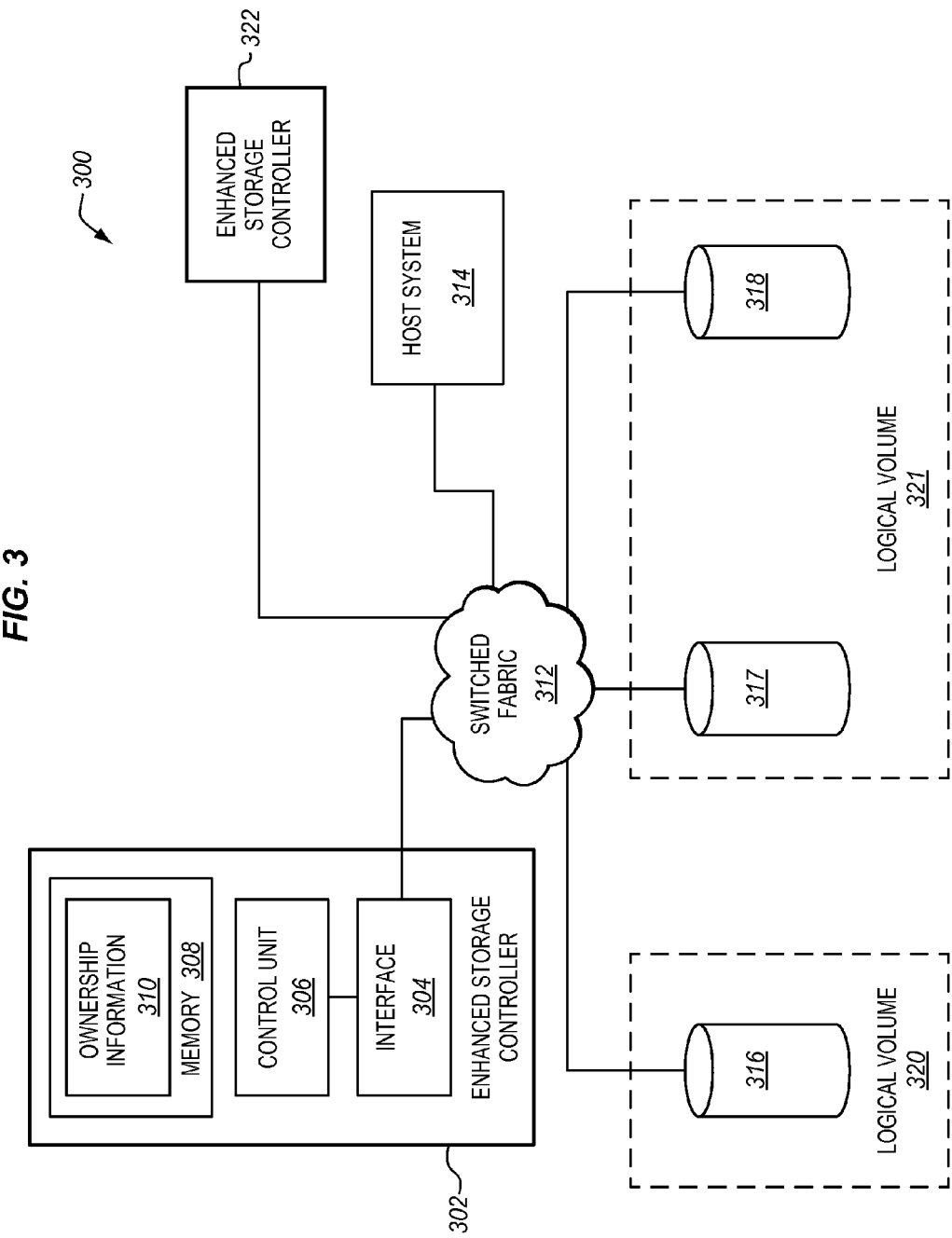
FIG. 3 is a block diagram of an exemplary enhanced storage controller operating within a clustered storage system in accordance with features and aspects hereof to hide the existence of storage devices and/or logical volumes to a host system.

FIG. 3 is a block diagram of an exemplary enhanced storage controller 302 operating in clustered storage system 300 in accordance with features and aspects hereof to hide the existence of storage devices and/or logical volumes to a host system. FIG. 3 illustrates storage controller 302 that communicatively couples a host system 314 with one or more storage devices 316-318 via switched fabric 312. Switched fabric 312 may provide similar capabilities as described with respect to fabric 130 of FIG. 1, and fabric 230 and 250 of FIG. 2. Storage devices 316-318 may also comprise any system for persistently storing data, such previously described for storage devices 142 and 242 of FIG. 1 and FIG. 2, respectively.

Storage controller 302 of FIG. 3 comprises an interface 304, a control unit 306, and a memory 308 that stores ownership information 310. Ownership information 310 is utilized by storage controller 302 to determine if storage controller 302 is authorized to access one or more storage devices 316-318. Ownership information 310 may be derived from metadata persistently written to storage devices 316-318, such as Disk Data Format (DDF) information. Ownership information 310 may also be shared between storage controllers, such as between enhanced storage controllers 302 and 322. Generally, how ownership information 310 is stored and/or provided to storage controller 302 is a matter of design choice. Using ownership information 310, storage controller may hide, mask, etc., the existence of one or more storage devices 316-318 and/or the logical volumes 320-321 associated with storage devices 316-318 to host system 314 when storage controller 302 is not authorized to access a corresponding one or more of storage devices 316-318. In like manner, storage controller may expose, indicate, etc., the existence of one or more storage devices 316-318 and/or corresponding logical volumes 320-321 to host system 314 when storage controller 302 is authorized to access a corresponding one or more storage devices 316-318. When hidden, host system 314 does not "see" a particular storage device or an associated logical volume. Hiding the existence of the storage device to the host system may preclude the host system from identifying a software handle, a software identifier, a I/O identifier, a Logical Unit Number (LUN), etc., for accessing the storage device. For example, if storage controller 302 is not authorized to access storage devices 317-318, then storage controller 302 hides the existence of logical volume 321 and the corresponding storage devices 317-318 from host system 314 (e.g., for I/O operations). In contrast, if storage controller 302 is authorized to access storage devices 317-318, then storage controller 302 indicates the existence of logical volume 321 and the corresponding storage devices 317-318 to host system 314. When a storage device/logical volume is indicated as existing to host system 314, then host system 314 may perform I/O operations on the storage device(s)/logical volume(s). Indicating the existence of the storage device to the host system may allow the host system to identify a software handle, a software identifier, a I/O identifier, a Logical Unit Number (LUN), etc., for accessing the storage device.

Control unit 306 may be implemented, for example, as custom circuitry, as a special or general purpose processor executing programmed instructions stored in an associated program memory, or some combination thereof. Managing the operations of storage controller 302 includes processing I/O requests directed to logical volumes 320-321, storage devices 316-318, etc. Control unit 306 utilizes interface 304 to communicate with storage devices 316-318. Interface 304 represents an abstraction of one or more interface components in a typical storage controller such as controller 302. Typically a back end interface component of a controller enables communication between the controller and one or more storage devices (i.e., through a switched fabric such as SAS, Fibre Channel, Ethernet, etc.). A front end interface component, usually distinct from the back end interface component, is typically used to enable communication between the storage controller and one or more attached host systems. Where the storage controller is integral with a host system (such as in a system such as prior art architecture of FIG. 1), the front end interface may provide communication through system interface such as Peripheral Component Interconnect (PCI) or PCI-Express. Where the storage controller is external from any particular host system but rather integral within a storage system that is coupled with a plurality of host systems (such as the architecture of FIG. 2), the front end interface may couple the controller to a plurality of host systems through a switched fabric such as SAS, Fibre Channel, Ethernet, etc. In a clustered storage environment, each storage controller 302 is coupled with all other storage controllers (e.g., 322) of the clustered system. Any suitable communication channel (also represented by the abstraction of interface 304) may be used for such inter-controller communications (e.g., the front end interface used for host system communication, the back end interface used for storage device communication, or some dedicated inter-controller communication channel). Thus, the abstraction of interface 304 represents any such configuration suitable for a particular application that allows a storage controller to communicate with a plurality of storage devices, with other storage controllers, and with one or more host systems.

During the operation of storage controller 302, control unit 306 identifies ownership information 310 for storage devices 316-318, and determines if storage controller 302 is authorized to access each of storage devices 316-318 based upon ownership information 310. Control unit 306 then indicates or hides the existence of storage devices (and the associated logical volumes) from host system 314. For example, control unit 306 may identify ownership information 310 for storage device 316, and determine that storage controller 302 does not have authorization to access storage device 316. In response to determining that storage controller 302 does not have authorization, control unit 306 hides the existence of storage device 316 (and correspondingly, of logical volume 320) from host system 314. In continuing with the example, control unit 306 may identify ownership information 310 for storage devices 317-318, and determine that storage controller 302 has authorization to access storage devices 317-318. In response, control unit 306 indicates the existence of storage devices 317-318 (and correspondingly, of logical volume 321) to host system 314. In some cases, ownership information 310 may change for storage devices/logical volumes. For example, storage controller 302 may assume the ownership of logical volume 320 from another storage controller, such as storage controller 322. When this occurs, storage controller 302 may update ownership information 310 and correspondingly, revise which storage devices and logical volumes are exposed or hidden from host system 214. Updating ownership information 310 may include persistently writing data to one or more storage device 316-318, transmitting copies of ownership information 310 to other storage controllers such as storage controller 322, etc.

Using enhanced storage controller 302 within clustered storage system 300 provides a number of advantages in terms of controlling how clustered storage is implemented. For example, because storage controllers hide storage devices and/or their associated logical volumes from hosts that the storage controllers are not authorized to access, the hosts do not generate unnecessary I/O traffic to the storage controllers in attempting to access the storage devices and/or the logical volumes. Precluding such I/O traffic reduces the potential for unnecessary and confusing error reporting and recovery that may result from such inappropriate I/O traffic.

FIG. 4 is a flowchart describing an exemplary method 400 in accordance with features and aspects hereof to control the visibility of storage devices and logical volumes in a clustered storage environment. The method of FIG. 4 may be operable in a storage controller such as described above with regard to storage controller 302 of FIG. 3. More specifically, method 400 may be operable in control unit 306 of FIG. 3.

Step 402 comprises identifying, by a storage controller, ownership information for a storage device. The ownership information defines a storage controller that is authorized to access the storage device. Identifying the ownership information may include reading metadata from one or more storage devices, querying one or more storage controllers, etc. The ownership information may be stored on the controller in fast memory. The information may be initialized at start of day from DDF metadata stored on storage devices, and written to the fast memory for use by the storage controller during operation.

Step 404 comprises determining, by the storage controller, if the storage controller is authorized to access the storage device. If the storage controller is not authorized, then step 408 is performed. If the storage controller is authorized to access the storage device, then step 406 is performed.

Step 406 comprises indicating, by the storage controller, the existence of the storage device to a host system. When a storage device exists or is exposed to the host system, the host system may be free to issue I/O commands for the storage device. This allows the host system to read/write data from/to the storage device.

Step 408 comprises hiding, by the storage controller, the existence of the storage device to the host system. When a storage device is hidden or not exposed to the host system, the host system may not be free to issue I/O commands for the storage device. This prevents the host system from reading/writing data from/to the storage device. This may also prevent the host system from determining the LUN for the storage device.

FIG. 5 is a block diagram of another exemplary enhanced storage controller 502 operating within a clustered storage system 500 in accordance with features and aspects hereof to hide the existence of storage devices and/or logical volumes to portions of a storage controller and/or a host system.

In FIG. 5, storage controller 502 communicatively couples host system 314 with storage devices 316-318 via switched fabric 516 and 517, respectively. Switched fabric 516-517 may be similar to fabric 130 of FIG. 1, and fabric 230 and 250 of FIG. 2. Storage controller 502 includes a back end interface 504, a physical device manager 506, an abstraction layer 508, a logical device manager 510, a front end interface 512, and memory 308 that stores ownership information 310. Back end interface 504 communicatively couples storage controller 502 to storage devices 316-318 via switched fabric 517. Front end interface 512 communicatively couples storage controller 502 to host system 314 via switched fabric 516. Back end interface 504 may communicate with storage devices 316-318 utilizing a variety of protocols and media such as SAS, Fibre Channel, Ethernet, etc. In like manner, front end interface 512 may communicate with host system 314 utilizing a variety of protocols and media such as SAS, Fibre Channel, Ethernet, PCI, PCI-Express, etc.

Coupled with back end interface 504 of storage controller 502 is physical device manager 506. Physical device manager 506 manages physical storage devices, such as storage devices 316-318. Generally, physical device manager 506 passes physical device and logical device information associated with storage devices 316-318 to logical device manager 510 via abstraction layer 508. Logical device manager 510 exposes logical volumes that are discovered by logical device manager 510 to host system 314. To do so, logical device manager may assemble metadata stored on storage devices 316-318 in order to determine a configuration for the logical volume(s) if storage devices 316-318 are discovered by logical device manager 510. Such configurations may include redundancy, such as mirroring, RAID levels 5, 6, etc. Thus, while physical device manager 506 is generally responsible for managing physical devices, logical device manager 510 is generally responsible for managing logical volumes that are provisioned by the physical devices as long as logical device manager 510 is aware of the underlying storage devices of the logical volumes.

During operation of storage controller 502, back end interface 504 communicates with one or more storage device 316-318. This may occur as part of a normal discovery process, such as performed during a power on or reset sequence for storage devices 316-318 and/or storage controller 502.

Abstraction layer 508 lies between physical device manager 506 and logical device manager 510. Abstraction layer 508 may be implemented in hardware, software, or a combination of both. For example, abstraction layer 508 may be implemented as a software module executing on a processor. In this embodiment, abstraction layer 508 identifies ownership information for one or more logical volumes, and determines if storage controller 502 is authorized to access the logical volumes based upon ownership information 310. Abstraction layer 508, based on the logical volumes and storage devices that physical device manager 506 discovers, then indicates or hides the existence of storage devices of one or more logical volumes from logical device manager 510. This in turn abstracts the logical volumes from their respective hosts. For example, abstraction layer 508 may determine that storage controller 502 does not have authorization to access logical volume 320. In response, abstraction layer 508 hides or discards information about the existence of storage device 316 from logical device manager 510, which also abstracts the existence of logical volume 320. As logical device manager 510 is not aware of logical volume 320, the logical device manager 510 does not indicate the existence of logical volume 320 (and storage device 316) to host system 314. Access rights to the logical volumes may be defined on a controller-by-controller basis for multiple controllers, although traffic for the logical volumes would be routed through the storage controller owning the logical volume. Additionally, the abstraction applied at abstraction layer 508 is not necessarily applied only to host system 314 but also to other parts of the controller stack above the abstraction layer.

In continuing with the example, abstraction layer 508 may determine that storage controller 502 has authorization to access logical volume 321. In response, abstraction layer 508 indicates the existence of logical volume 321 (and storage devices 317-318) to logical device manager 510. This may be performed by allowing information about logical volume 321 (and storage devices 317-318) to pass through logical device manager 510. As logical device manager 510 is now aware of logical volume 321 (and of storage devices 317-318), the logical device manager 510 indicates the existence of logical volume 321 (and/or storage devices 317-318) to host system 314.

In some embodiments, storage controller 502 may include an ownership manager 514, as ownership information 310 may change for logical volumes 320-321. For example, storage controller 502 may assume the ownership of a transferred logical from a different storage controller. When this occurs, ownership manager 514 may work in cooperation with abstraction layer 508 to update ownership information 310 associated with the transferred logical volume, and to indicate the existence of the transferred logical volume to host system 314. In like manner, storage controller 502 may transfer the ownership of a logical volume to a different storage controller. When this occurs, ownership manager 514 may work in cooperation with abstraction layer 508 to update ownership information 310 associated with the logical volume that is transferred to the other storage controller. Abstraction layer 508 may then hide the existence of the logical volume that was transferred to the other storage controller to host system 314. In an exemplary transfer of ownership, a request to transfer ownership identifies storage devices for which ownership is being transferred. The controller assuming ownership of the storage devices then inspects the storage devices to determine which logical volumes are provisioned on them, and updates ownership information 310.

While the invention has been illustrated and described in the drawings and foregoing description, such illustration and description is to be considered as exemplary and not restrictive in character. Some embodiments of the invention and minor variants thereof have been shown and described. In particular, features shown and described as exemplary software or firmware embodiments may be equivalently implemented as customized logic circuits and vice versa. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A storage controller communicatively coupling a host system with a plurality of storage devices, the storage controller comprising:
   a physical device manager operable to communicate with the storage devices, wherein the storage devices provision one or more logical volumes,
   a logical device manager operable to expose logical volumes that are discovered by the logical device manager to the host system for Input/Output (I/O) operations; and
   an abstraction layer between the physical device manager and the logical device manager, the abstraction layer operable to identify ownership information for the one or more logical volumes, wherein the ownership information defines a storage controller that is authorized to access a logical volume,
   wherein the abstraction layer is further operable to determine if the storage controller is authorized to access the logical volume based upon the ownership information,
   wherein the abstraction layer is further operable to:
      indicate an existence of the storage devices that provision the logical volume to the logical device manager responsive to determining that the storage controller is authorized to access each of the storage devices that provision the logical volume; and
      hide the existence of the storage devices that provision the logical volume from the logical device manager responsive to determining that the storage controller is not authorized to access at least one of the storage devices that provision the logical volume.

2. The storage controller of claim 1 further comprising:
   an ownership manager communicatively coupled with the abstraction layer,
   wherein the ownership manager is operable to acquire ownership of a transferred logical volume from another storage controller, and to update the ownership information for the transferred logical volume responsive to acquiring the ownership.

3. The storage controller of claim 2 wherein:
   the ownership manager is further operable to indicate the existence of storage devices that provision the transferred logical volume to the logical device manager responsive to acquiring the ownership.

4. The storage controller of claim 1 wherein:
   hiding the existence of the storage devices that provision the logical volume from the logical device manager prevents the host system from determining a Logical Unit Number (LUN) for the logical volume.

5. The storage controller of claim 1 further comprising:
   an ownership manager communicatively coupled with the abstraction layer,
   wherein the ownership manager is operable to transfer ownership of a logical volume to another storage controller, and to update the ownership information for the transferred logical volume responsive to transferring the ownership.

6. The storage controller of claim 5 wherein:
   the ownership manager is further operable to hide the existence of storage devices that provision the transferred logical volume to the logical device manager responsive to transferring the ownership.

7. The storage controller of claim 1 wherein:
   hiding the existence of the storage devices that provision the logical volume from the logical device manager prevents the host system from identifying a software handle for the logical volume.

8. The storage controller of claim 1 wherein:
   the ownership information for the one or more logical volumes comprises Disk Data Format information.

9. The storage controller of claim 1 wherein:
   hiding the existence of the storage devices that provision the logical volume from the logical device manager prevents the host system from issuing I/O operations to the logical volume.

10. A method operable on a storage controller that communicatively couples a host system with a plurality of storage devices, the method comprising:
   identifying, by an abstraction layer of the storage controller, ownership information that defines a storage controller that is authorized to access a logical volume provisioned by the storage devices, wherein the abstraction layer couples a physical device manager that communicates with the storage devices to a logical device manager that exposes logical volumes that are discovered by the logical device manager to the host system for Input/Output (I/O) operations;
   determining, by the abstraction layer, if the storage controller is authorized to access the logical volume based upon the ownership information;
   indicating, by the abstraction layer, an existence of the storage devices that provision the logical volume to the logical device manager responsive to determining that the storage controller is authorized to access each of the storage devices that provision the logical volume; and
   hiding, by the abstraction layer, the existence of the storage devices that provision the logical volume from the logical device manager responsive to determining that the storage controller is not authorized to access at least one of the storage devices that provision the logical volume.

11. The method of claim 10 further comprising:
acquiring, by an ownership manager of the storage controller coupled with the abstraction layer, ownership of a transferred logical volume from another storage controller; and
updating, by the ownership manager, the ownership information for the transferred logical volume responsive to acquiring the ownership.

12. The method of claim 11 further comprising:
indicating, by the ownership manager, the existence of storage devices that provision the transferred logical volume to the logical device manager responsive to acquiring the ownership.

13. The method of claim 10 wherein:
hiding the existence of the storage devices that provision the logical volume from the logical device manager prevents the host system from determining a Logical Unit Number (LUN) for the logical volume.

14. The method claim 10 further comprising:
transferring, by an ownership manager of the storage controller coupled with the abstraction layer, ownership of a logical volume to another storage controller; and
updating, by the ownership manager, the ownership information for the transferred logical volume responsive to transferring the ownership.

15. The method of claim 14 further comprising:
hiding, by the ownership manager, the existence of storage devices that provision the transferred logical volume to the logical device manager responsive to transferring the ownership.

16. The method of claim 10 wherein:
hiding the existence of the storage devices that provision the logical volume from the logical device manager prevents the host system from identifying a software handle for the logical volume.

17. The method of claim 10 wherein:
the ownership information for the logical volume comprises Disk Data Format information.

18. The method of claim 10 wherein:
hiding the existence of the storage devices that provision the logical volume from the logical device manager prevents the host system from issuing I/O operations to the logical volume.

* * * * *